(No Model.) 2 Sheets—Sheet 2.
J. E. BOURNE.
GATE.
No. 431,643. Patented July 8, 1890.
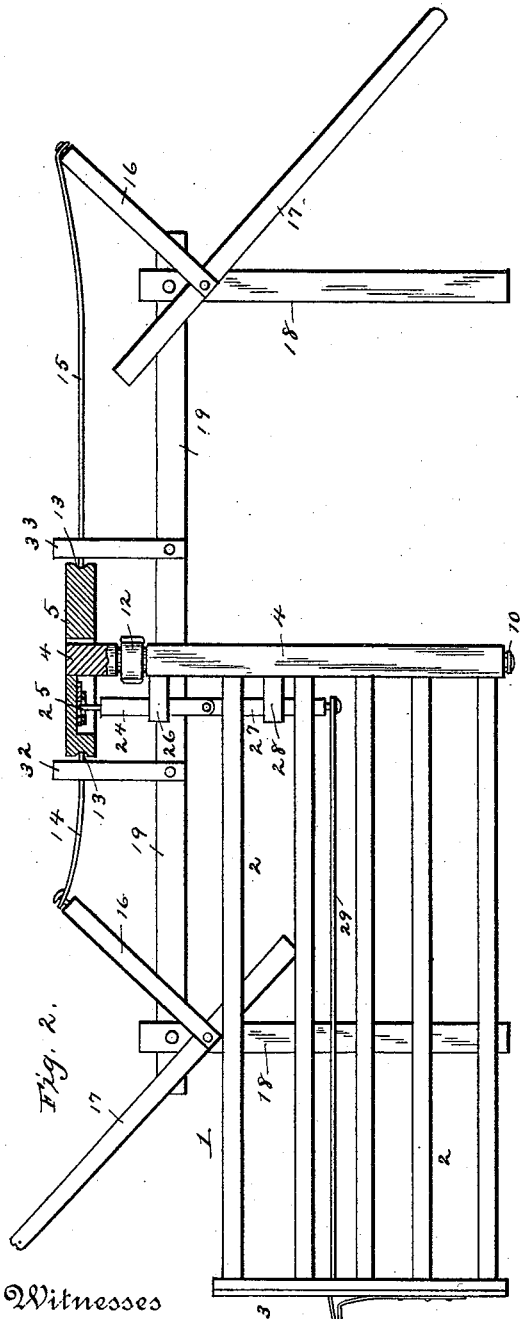
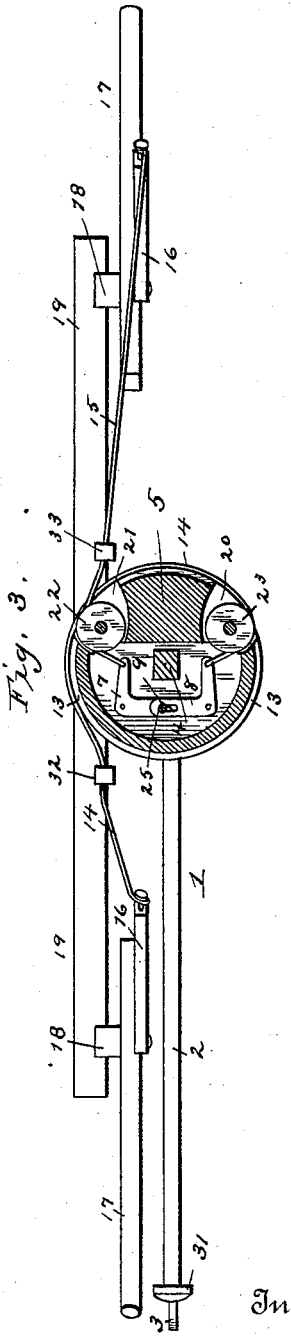
Witnesses
Harry L. Amer.
H. F. Riley
Inventor
John E. Bourne.
By his Attorneys
C. A. Snow & Co.

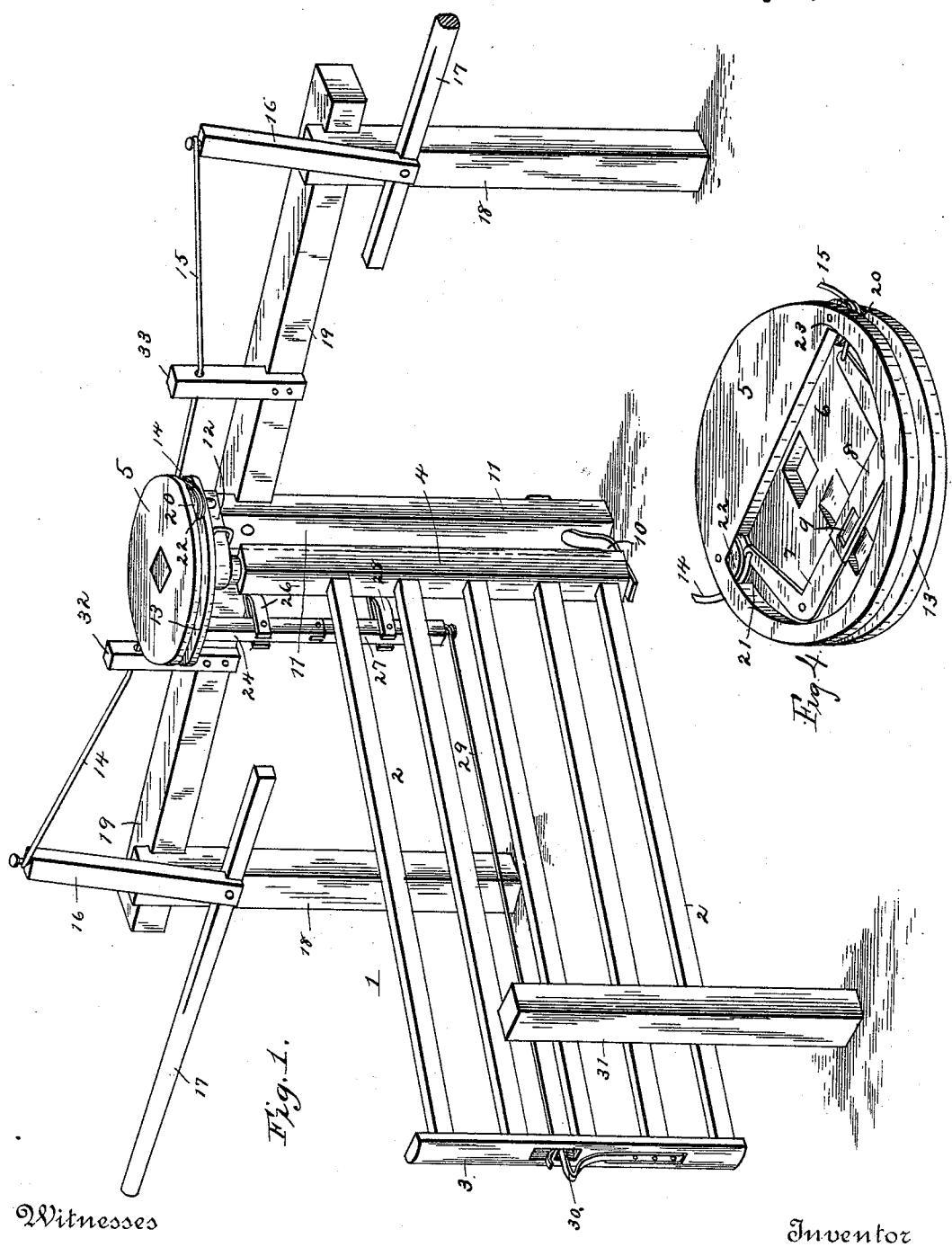

UNITED STATES PATENT OFFICE.

JOHN E. BOURNE, OF SOMERVILLE, OHIO.

GATE.

SPECIFICATION forming part of Letters Patent No. 431,643, dated July 8, 1890.

Application filed March 5, 1890. Serial No. 342,751. (No model.)

*To all whom it may concern:*

Be it known that I, JOHN E. BOURNE, a citizen of the United States, residing at Somerville, in the county of Butler and State of Ohio, have invented a new and useful Gate, of which the following is a specification.

The invention relates to improvements in gates.

The object of the present invention is to provide a gate of simple and inexpensive construction adapted to be opened and retained in its open position and also to be readily closed without dismounting from a horse or leaving a vehicle.

The invention consists in the construction and novel combination and arrangement of parts hereinafter fully described, illustrated in the accompanying drawings, and pointed out in the claims hereto annexed.

In the drawings, Figure 1 is a perspective view of a gate constructed in accordance with the invention. Fig. 2 is a side elevation, partly in section. Fig. 3 is a plan view, the disk being illustrated in section to show the disposition of its parts. Fig. 4 is a detail perspective view of the disk.

Referring to the accompanying drawings, 1 designates a gate of ordinary construction and composed of parallel rails 2 and vertical end bars 3 and 4, the latter of which is extended above the gate and has rigidly secured to its upper end a disk 5, that is constructed of suitable material, preferably metal, and is provided in its lower face with a recess 6, in which are pivoted a pair of L-shaped levers 7 and 8, which have their adjacent ends lapping and provided with slots 9. The vertical end bar of the gate has its lower end pivoted in a bracket 10, suitably secured to a hinge-post 11, and the upper end slightly below the disk is rounded and is mounted in a strap 12, that has its ends secured to the sides of the hinge-post. The disk has its periphery provided with a circumferential groove 13, in which are arranged wires 14 and 15. These are wound in opposite directions and have their outer or farther ends connected to vertical arms 16 of operating-levers 17, pivoted to the sides of frame-posts 18, connected by a cross-piece 19, that is also centrally secured to the hinge-post. The disk is provided with oppositely-disposed slots 20 and 21, that communicate with the recess 6 of the disk and have mounted within them rollers or pulleys 22 and 23, around which pass the wires 14 and 15. These wires have their other ends connected to the farther ends of the L-shaped levers 7 and 8, and when the operating-levers are pulled upon they cause the slotted ends to move back and forth and carry with them a pivoted bar 24, the upper end of which is provided with a pin 25, arranged in the slots of the lapping ends of the L-shaped levers. This bar 24 is mounted in a bracket 26, secured to the vertical end bar of the gate, and has its lower end bifurcated and pivoted to a similar bar 27, which is pivoted in a bracket 28, and has its lower end connected to one end of a wire, cord, or the like 29, having its other end secured to a spring-actuated latch 30, mounted upon the end post 3 of the gate and adapted to engage automatically a latch-post 31 and the frame-posts 18. It will readily be seen that when one of the operating-levers 17 is pulled downward the disk will be rotated and the slotted arms of the L-shaped levers will be drawn back, which will cause the lower end of the pivoted bar 27 to be moved in the same direction to withdraw the latch from the recess in the latch-post, and the gate will be opened and will engage one of the frame-posts and become automatically locked by the spring-actuated latch. After passing through the gate the other operating-lever is pulled upon, which will withdraw the latch from the recess in the vertical post of the frame, and the disk will be rotated and the gate closed. The frame is provided on each side of the disk with vertical arms 32 and 33, which are secured to the cross-piece and are provided with perforations through which the wires 14 and 15 are passed to support the same and prevent their being twisted or tangled.

Having thus described my invention, what I claim is—

1. The combination of the gate provided with a latch and having its end bar extended vertically above the gate, two bars arranged vertically and pivoted together and to the end post, the lower bar being connected to the latch, the disk mounted upon the end bar, the L-shaped levers pivoted to the disk and having their adjacent ends connected to the upper one of said pivoted bars, and the wires passing around the disk and connected to the ends of the L-shaped levers, substantially as described.

2. The combination, with the gate provided with a latch and having its end bar 4 extended vertically, two bars arranged vertically and pivoted to each other and to the end post, the disk rigidly mounted upon the end bar and provided in its lower face with a recess and having oppositely-disposed slots communicating with the recess, said disk having its periphery grooved, the pivoted levers mounted in the recess and having their adjacent ends connected to the pivoted bars, the wires passing around the disk arranged in the groove thereof and connected to said levers, and the operating-levers connected to the ends of the wires, substantially as described.

3. The combination, with the gate provided with a latch and having its end bar 4 vertically extended, two bars arranged vertically and pivoted together and to the end post, the disk rigidly mounted upon the upper end of the bar 4 and provided in its lower face with a recess, and oppositely-disposed slots communicating with the recess and having its periphery grooved, the L-shaped levers pivoted in the recess and having their adjacent ends lapping and provided with slots to receive the upper one of the pivoted bars, and the wires passing around the disks and arranged in the groove and having their adjacent ends connected to the L-shaped levers and their farther ends connected to the operating-levers, substantially as described.

4. The combination, with the gate provided with a latch and having its end bar 4 extended vertically, of the bars 24 and 27, pivoted to the end bar and having their adjacent ends pivoted together, the disk mounted upon the end bar and having its periphery grooved and provided with a recess 6, and oppositely-disposed slots communicating with the recess, the pulleys mounted in the slots, the L-shaped levers pivoted in the recess and having their adjacent ends lapping and provided with slots to receive the end of the upper pivoted bar, and the wires oppositely arranged around the disk and having their inner or adjacent ends connected to the L-shaped levers and their outer end connected to the operating-lever, substantially as described.

5. The combination of the gate provided with a spring-actuated latch and having its end bar 4 vertically extended, the disk rigidly mounted upon the end bar and having its periphery grooved and provided with a recess, and oppositely-disposed slots communicating with the recess, the L-shaped levers pivoted in the recess and having their adjacent ends lapping and provided with slots, the bars 24 and 27, pivoted to the end bar and having their adjacent ends pivoted together and their farther ends connected, respectively, with the latch and the adjacent ends of the L-shaped levers, and the wires oppositely arranged around the disk and having their adjacent ends connected to the L-shaped levers and their farther ends connected to operating-levers, substantially as described.

In testimony that I claim the foregoing as my own I have hereto affixed my signature in presence of two witnesses.

JOHN E. BOURNE.

Witnesses:
JOSEPH G. DENINS,
JOHN W. MCLAIN.